(12) United States Patent
Chen et al.

(10) Patent No.: US 12,106,348 B2
(45) Date of Patent: Oct. 1, 2024

(54) PRODUCT PRESENTATION ASSISTED BY VISUAL SEARCH

(71) Applicant: NIKE, Inc., Beaverton, OR (US)

(72) Inventors: Roger D. Chen, Beaverton, OR (US); Meghan Pruitt, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 2 days.

(21) Appl. No.: 17/988,868

(22) Filed: Nov. 17, 2022

(65) Prior Publication Data
US 2023/0079357 A1    Mar. 16, 2023

Related U.S. Application Data

(63) Continuation of application No. 16/910,664, filed on Jun. 24, 2020, now Pat. No. 11,532,024, which is a continuation of application No. 15/787,010, filed on Oct. 18, 2017, now Pat. No. 10,733,649, which is a continuation of application No. 14/210,951, filed on Mar. 14, 2014, now Pat. No. 9,830,630.

(60) Provisional application No. 61/792,449, filed on Mar. 15, 2013.

(51) Int. Cl.
| | |
|---|---|
| G06Q 30/00 | (2023.01) |
| G06F 16/58 | (2019.01) |
| G06F 16/9535 | (2019.01) |
| G06F 16/9538 | (2019.01) |
| G06Q 30/0601 | (2023.01) |

(52) U.S. Cl.
CPC ......... *G06Q 30/0623* (2013.01); *G06F 16/58* (2019.01); *G06F 16/9535* (2019.01); *G06F 16/9538* (2019.01); *G06Q 30/0621* (2013.01); *G06Q 30/0631* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,083,267 | A  | 7/2000  | Motomiya et al. |
| 7,996,282 | B1 | 8/2011  | Scott et al. |
| 8,412,594 | B2 | 4/2013  | Kundu |
| 8,538,836 | B1 | 9/2013  | Scott et al. |
| 8,612,306 | B1 | 12/2013 | Mukherjee et al. |
| 8,694,366 | B2 | 4/2014  | Barnes, Jr. |
| 8,737,728 | B2 | 5/2014  | Bhardwaj et al. |
| 8,965,788 | B2 | 2/2015  | Gonsalves et al. |

(Continued)

OTHER PUBLICATIONS

Edward Shen et al. "Fashion Recommendation and Social Networking based on Commonsense Computing" CHI 2006, Apr. 22-27, 2006, Montreal, Canada (Year: 2006).*

(Continued)

*Primary Examiner* — Naeem U Haq
(74) *Attorney, Agent, or Firm* — Banner & Witcoff, Ltd.

(57) ABSTRACT

Example embodiments may provide a system, apparatus, computer readable media, and/or method configured for processing input representing data associated with a first product, the first product comprising a plurality of components, processing input representing a particular one of the components, processing input representing an attribute of the particular component or of the first product, querying a product memory based on the particular component and the attribute to identify a second product.

20 Claims, 10 Drawing Sheets

(56) References Cited

U.S. PATENT DOCUMENTS

| | | |
|---|---|---|
| 9,311,666 B2 | 4/2016 | Bhardwaj et al. |
| 9,721,192 B2 | 8/2017 | Bhardwaj et al. |
| 9,953,356 B2 | 4/2018 | Sunkada |
| 2002/0169686 A1 | 11/2002 | Zweben et al. |
| 2004/0177009 A1 | 9/2004 | Schrenk |
| 2005/0283405 A1 | 12/2005 | Mallo et al. |
| 2006/0069623 A1 | 3/2006 | MacDonald Korth et al. |
| 2006/0241901 A1 | 10/2006 | Hanus et al. |
| 2007/0005437 A1 | 1/2007 | Stoppelman |
| 2007/0050403 A1 | 3/2007 | Dhairyawan et al. |
| 2007/0150403 A1* | 6/2007 | Mock ................... G06Q 40/04 705/37 |
| 2007/0156527 A1 | 7/2007 | Rubinstein |
| 2007/0168357 A1 | 7/2007 | Mo |
| 2007/0174790 A1 | 7/2007 | Jing et al. |
| 2008/0097975 A1 | 4/2008 | Guay et al. |
| 2008/0152231 A1 | 6/2008 | Gokturk et al. |
| 2009/0037412 A1 | 2/2009 | Bard et al. |
| 2009/0094260 A1 | 4/2009 | Cheng et al. |
| 2009/0271293 A1 | 10/2009 | Parkhurst et al. |
| 2010/0070378 A1 | 3/2010 | Trotman et al. |
| 2010/0076867 A1 | 3/2010 | Inoue et al. |
| 2010/0086192 A1 | 4/2010 | Grigsby et al. |
| 2010/0217684 A1 | 8/2010 | Melcher et al. |
| 2010/0235259 A1 | 9/2010 | Farraro et al. |
| 2010/0250336 A1 | 9/2010 | Selinger et al. |
| 2011/0078055 A1 | 3/2011 | Faribault et al. |
| 2011/0157226 A1 | 6/2011 | Ptucha et al. |
| 2011/0184972 A1 | 7/2011 | Ard et al. |
| 2012/0005044 A1 | 1/2012 | Coleman |
| 2012/0047146 A1 | 2/2012 | Balakrishnan et al. |
| 2012/0054041 A1 | 3/2012 | Williams |
| 2012/0054059 A1 | 3/2012 | Rele |
| 2012/0054060 A1 | 3/2012 | Kundu |
| 2012/0124036 A1 | 5/2012 | Ramos et al. |
| 2012/0311495 A1 | 12/2012 | Evers |
| 2013/0084000 A1 | 4/2013 | Bhardwaj et al. |
| 2013/0084002 A1 | 4/2013 | Bhardwaj et al. |
| 2013/0145319 A1 | 6/2013 | Wein et al. |
| 2013/0173402 A1 | 7/2013 | Young et al. |
| 2013/0226743 A1 | 8/2013 | Kundu |
| 2013/0290106 A1 | 10/2013 | Bradley et al. |
| 2013/0317894 A1 | 11/2013 | Zhu et al. |
| 2014/0089145 A1 | 3/2014 | Sunkada |
| 2014/0095285 A1 | 4/2014 | Wadell et al. |
| 2014/0129305 A1 | 5/2014 | Frame |
| 2014/0156459 A1 | 6/2014 | Zises |
| 2014/0201001 A1 | 7/2014 | Rellas et al. |
| 2014/0201028 A1 | 7/2014 | Bhardwaj et al. |
| 2014/0279246 A1 | 9/2014 | Chen et al. |
| 2014/0279249 A1 | 9/2014 | Westphal |
| 2014/0358884 A1 | 12/2014 | Nandyal et al. |
| 2015/0154685 A1 | 6/2015 | Pope et al. |
| 2015/0170258 A1 | 6/2015 | Kulig et al. |
| 2015/0262120 A1 | 9/2015 | Kulig et al. |
| 2016/0189011 A1 | 6/2016 | Bhardwaj et al. |
| 2016/0335667 A1 | 11/2016 | Aubrey |
| 2017/0287044 A1 | 10/2017 | Rose et al. |

OTHER PUBLICATIONS

Sep. 1, 2014—(WO) ISR & WO—App. No. PCT/US14/028471.

Michael K. Hidrue et al. "Willingness to pay for electric vehicles and their attributes" Resource and Energy Economics 33 (2011) 686-705 (Year: 2011).

* cited by examiner

Selected Components — 602

- Sole ☑ Keep ☐ Remove
- Toe Box ☑ Keep ☐ Remove
- Laces ☐ Keep ☑ Remove

What components are of interest? — 604

FIG. 6

PRODUCT PRESENTATION ASSISTED BY VISUAL SEARCH

CROSS-REFERENCE TO RELATED APPLICATION

This application is a continuation of U.S. application Ser. No. 16/910,664, filed Jun. 24, 2020, which is a continuation of U.S. application Ser. No. 15/787,010, entitled "Product Presentation Assisted by Visual Search" and filed Oct. 18, 2017, now issued as U.S. Pat. No. 10,733,649 on Aug. 4, 2020 and claims priority to U.S. application Ser. No. 14/210,951, entitled "Product Presentation Assisted by Visual Search" and filed Mar. 14, 2014, now issued as U.S. Pat. No. 9,830,630 on Nov. 28, 2017, which claims the benefit of priority from U.S. provisional application Ser. No. 61/792,449, entitled "PRODUCT PRESENTATION ASSISTED BY VISUAL SEARCH," and filed on Mar. 15, 2013. The content of the above noted applications is hereby incorporated by reference in its entirety.

BACKGROUND

Consumers increasingly rely on the Internet when deciding which products and services to buy. Retailer websites provide users with information to aid in such decisions. These websites may list different product types that may be sorted based on price or feedback from other purchasers. In response to selection of a product, the website may present product photographs as well as other information on the selected product. While consumers may enjoy the convenience of shopping away from a physical store of a retailer, oftentimes consumers may not be able to find what they are looking for on the website. In such cases, a user may put off a purchase or go to a store to complete the purchase. Even when shopping at a physical store, a user may require assistance to locate a desired product. Considering these problems, tools to better assist customers when buying online or at a physical store are needed.

SUMMARY

The following presents a general summary of aspects of the disclosure in order to provide a basic understanding of at least some of its aspects. This summary is not an extensive overview of the invention. It is not intended to identify key or critical elements of the invention or to delineate the scope of the invention. The following summary merely presents some concepts of the invention in a general form as a prelude to the more detailed description provided below.

Aspects described herein relate to identification of one or more other products based on a selection or identification of an initial product. In one or more examples, the initial product may be composed of a variety of features, attributes, components, materials and the like. These attributes may then be used to identify one or more other products that may be desirable to the shopper and purchaser. The shopper or purchaser may also set or modify the values or characteristics of these attributes to refine a search for a desirable product.

According to other aspects, a first product or attributes of a first product may be determined based on input. The input may include an image of a first product (or portion of an image). The image of the product may then be analyzed to determine one or more components of the product and a characteristic or attribute of the at least one component. Based on this analysis, the component and attributes of the component may be used to query a product memory or database to obtain a listing of products that may be desirable to a purchaser based on similarity or dissimilarity to the component identified from the image of the product.

According to one or more other aspects, a product search, selection and/or recommendation may be performed in a step-by-step manner. For example, an image of a product or a product itself may be analyzed to determine a first attribute. A first group of items may then be identified based on the first attribute. The first attribute or a value of the first attribute may be determined based on a user indication that the first attribute or a value (or range of values) for the first attribute is desirable. In other examples, a user may select an item from the first group of items to specify desirability. Subsequently, a second attribute of the selected item may be determined and the second attribute may further be used to identify a second group of items.

Other aspects and features are described throughout the application.

BRIEF DESCRIPTION OF THE DRAWINGS

To understand the present invention, it will now be described by way of example, with reference to the accompanying drawings in which:

FIG. 6 illustrates a selection field permitting a customer to individually select components of a product, in accordance with example embodiments.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," and the like may be used in this specification to describe various example features and elements, these terms are used herein as a matter of convenience, e.g., based on the example orientations shown in the figures. Nothing in this specification should be construed as requiring a specific three dimensional orientation of structures to fall within the scope of the example embodiments.

Various examples of the invention may be implemented using electronic circuitry configured to perform one or more functions. For example, some embodiments may be implemented using one or more application-specific integrated circuits (ASICs). Also, components of various examples of the invention may be implemented using a programmable computing device executing firmware or software instructions, or by some combination of purpose-specific electronic circuitry and firmware or software instructions executing on a programmable computing device.

Example Hardware Devices

Figure 1:
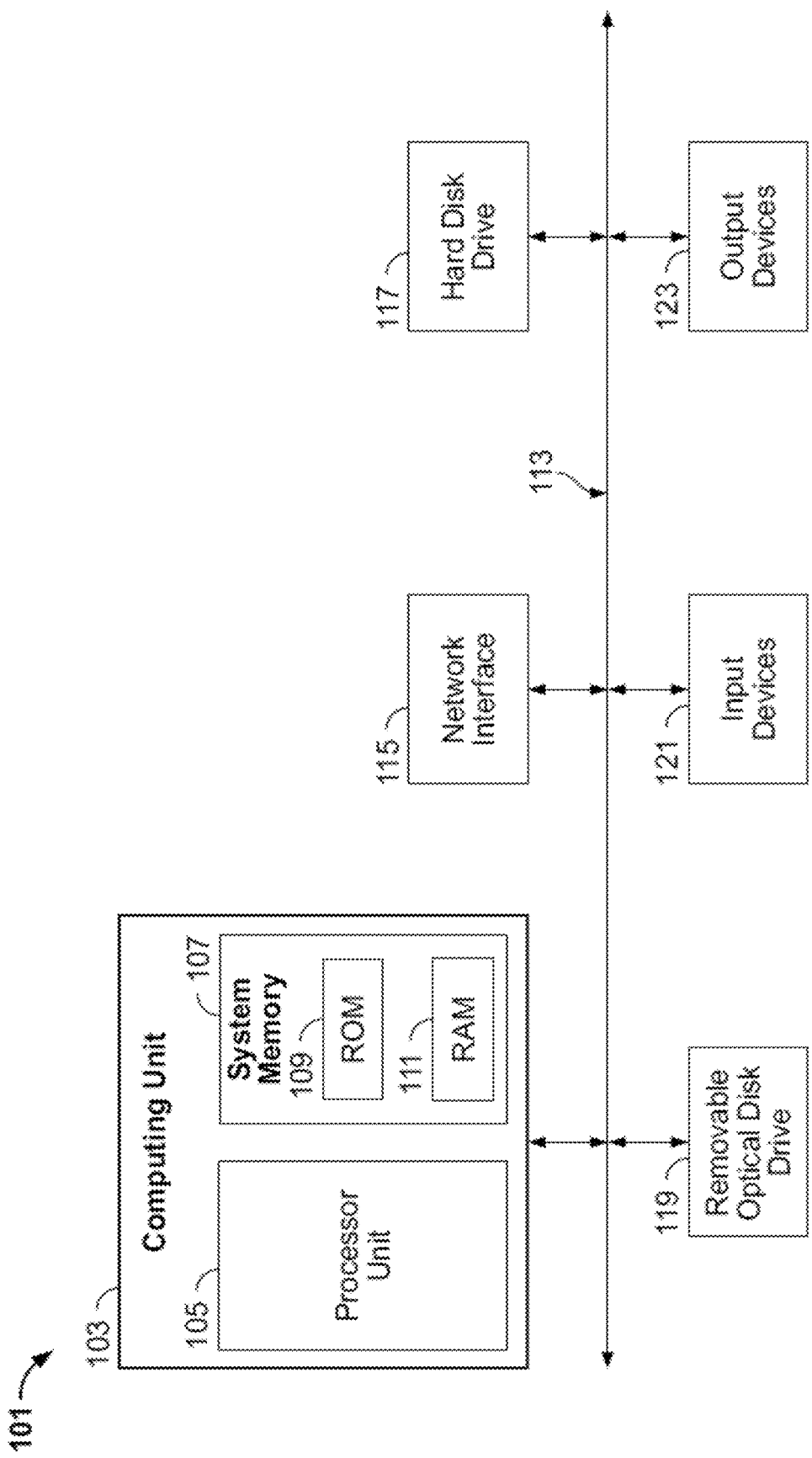
FIG. 1 shows one illustrative example of a computing device that can be used to implement various example embodiments.

FIG. 1 shows one illustrative example of a computing device 101 that can be used to implement various example embodiments. As seen in this figure, computing device 101 has a computing unit 103. Computing unit 103 may include a processing unit 105 and a system memory 107. Processing unit 105 may be any type of processing device for executing computer executable instructions, such as, for example, a microprocessor. System memory 107 may include both a read-only memory (ROM) 109 and a random access memory (RAM) 111. As will be appreciated by those of ordinary skill in the art, both read-only memory (ROM) 109 and random access memory (RAM) 111, as well as other types of computer readable media, may store computer executable instructions for execution by processing unit 105.

Processing unit 105 and system memory 107 may be connected, either directly or indirectly, through a bus 113 or alternate communication structure to one or more peripheral devices. For example, processing unit 105 or system memory 107 may be directly or indirectly connected to additional memory storage, such as a hard disk drive 117, a removable magnetic disk drive, a removable optical disk drive 119, and/or a flash memory card. Processing unit 105 and system memory 107 may also be directly or indirectly connected to one or more input devices 121 and one or more output devices 123. Input devices 121 may include, for example, a keyboard, touch screen, a remote control pad, a pointing device (such as a mouse, touchpad, stylus, trackball, or joystick), a scanner, a camera or a microphone. Output devices 123 may include, for example, a monitor display, television, printer, stereo, or speakers.

Still further, computing unit 103 may be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, computing device 101 may be connected to a variety of other peripheral devices, including some that may perform input, output and storage functions, or some combination thereof. For example, computing device 101 may be connected to a digital music player, such as an IPOD® brand digital music player available from Apple, Inc. of Cupertino, California. As known in the art, this type of digital music player can serve as both an output device for a computer (e.g., outputting music from a sound file or pictures from an image file) and a storage device.

In addition to a digital music player, computing device 101 may be connected to or otherwise include one or more other peripheral devices, such as a telephone. The telephone may be, for example, a wireless "smart phone." As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft WORD® or EXCEL® files, or Adobe ACROBAT® files), etc. Because of the data management capability of this type of telephone, a user may connect the telephone with computing device 101 so that their data maintained may be synchronized.

Of course, still other peripheral devices may be included with our otherwise connected to a computing device 101 of the type illustrated in FIG. 1. In some cases, a peripheral device may be permanently or semi-permanently connected to computing unit 103. For example, with many computers, computing unit 103, hard disk drive 117, removable optical disk drive and a display are semi-permanently encased in a single housing. Still other peripheral devices may be removeably connected to computing device 101, however. Computing device 101 may include, for example, one or more communication ports through which a peripheral device can be connected to computing unit 103 (either directly or indirectly through the bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computing device 101 may include a wireless data "port," such as a Bluetooth interface, a Wi-Fi interface, an infrared data port, or the like.

It should be appreciated that a computing device employed according various examples of the invention may include more components than computing device 101 illustrated in FIG. 1, fewer components than computing device 101, or a different combination of components than computing device 101. Some implementations of the invention, for example, may employ one or more computing devices that are intended to have a very specific functionality, such as a digital music player or server computer. These computing devices may thus omit unnecessary peripherals, such as network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

Figure 2:
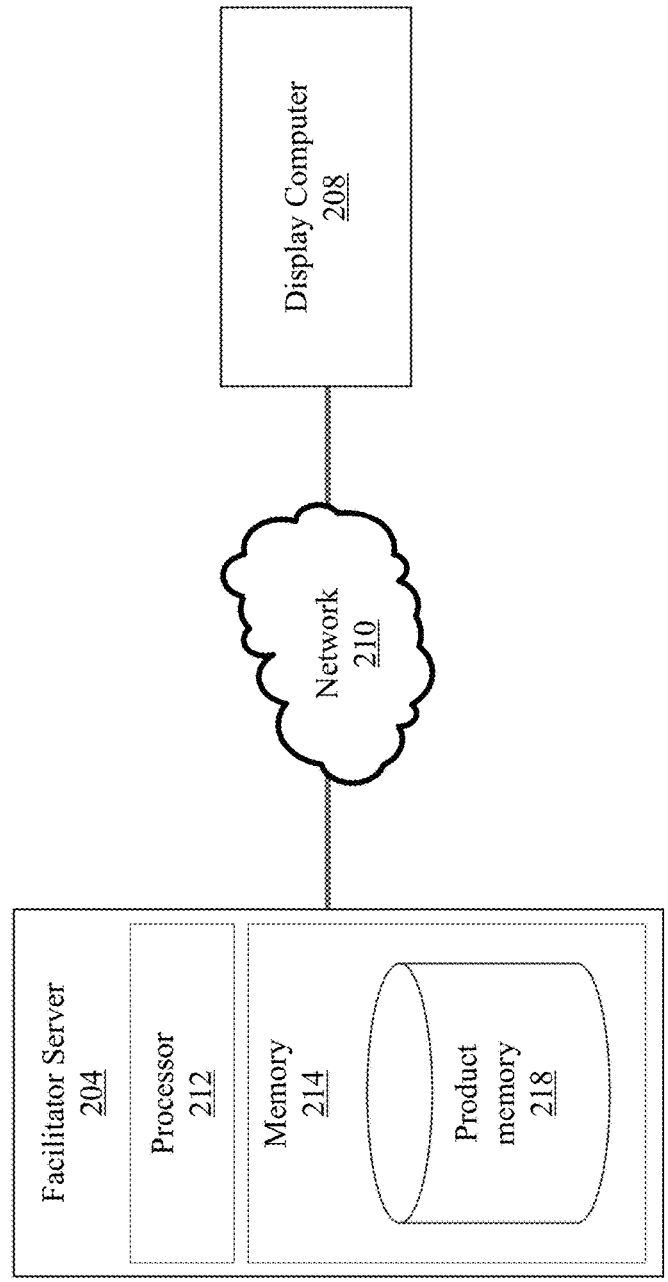
FIG. 2 illustrates a system in accordance with example embodiments.

FIG. 2 illustrates an example system 200 in which aspects described herein may be used or implemented. In one example, the system 200 may assist a customer using visual searching techniques to identify similar and complementary products using a graphical user interface (GUI). In an example, system 200 may include a network 210 interconnecting a facilitator server 204 and a display computer 208. Network 210 may be a local area network, a wide area network, combinations of different types of networks, or other manners transporting data between different devices. Facilitator server 204 and display computer 208 may include some or all components of computing device 101 depicted in FIG. 1.

Facilitator server 204 is shown including a processor 212, a memory 214, and a product memory or database 218. Facilitator server 204 may include additional or fewer components. Display computer 208 may be, for example, a smart phone, a media player, a mobile phone, a laptop computer, a desktop computer, a tablet computer, a kiosk in a commercial establishment, or other device. Only a single instance of each device is shown in FIG. 2; however, system 200 may include multiple instances of each device. Further, processing is described herein as being performed by a certain device may instead or additionally be performed by a different device. The depicted devices may also be combined and/or separated into multiple devices. System 200 may also include other devices that are not shown.

Figure 3:
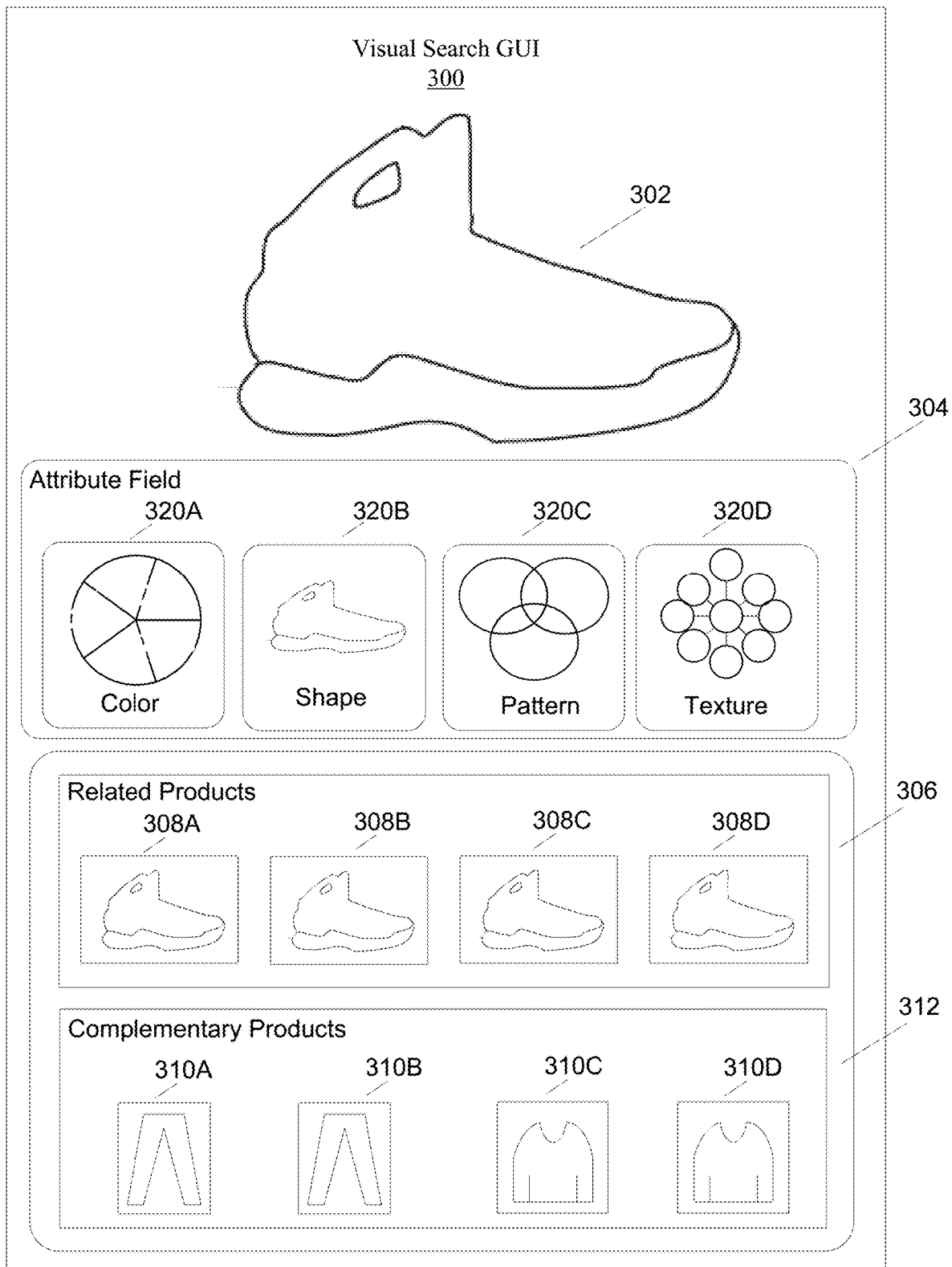
FIG. 3 illustrates an example Visual Search GUI in accordance with example embodiments.

The example embodiments may provide for visual searching to assist a customer in making purchasing decisions. For example, the assistance may include recommendations or search results displayed through a variety of interfaces including websites, an application user interface on a computer, smartphone, table, etc., or other type of electronic graphical user interface. FIG. 3 illustrates an example visual search graphical user interface 300 in accordance with example embodiments. Referring briefly again to FIG. 2, a customer may use display computer 208 to retrieve visual search graphical user interface 300 from facilitator server 204 (or a web server). In an example, visual search graphical user interface 300 may be a website retrieved by display computer 208 from facilitator server 204. In another example, when a customer enters a physical store or accesses a website, the customer may approach a display computer 208 that is a kiosk that retrieves and causes presentation of Visual Search GUI 300.

Initially, visual search graphical user interface 300 may present an image of a product 302. In some examples, multiple products may be displayed initially. The initially presented product may be variously selected: e.g., based on a user profile of the customer, based on a product on sale by the retailer, based on a product the retailer desires to emphasize in marketing, based on a product that the retailer's suppliers or other channel participants are promoting, subsidizing or otherwise encouraging. Facilitator server 204 may also determine which product to present based on input by the customer (e.g., text, selected product category, SKU, barcode, QR code, etc.). The customer may also upload or otherwise select the image of the product 302, e.g., using the display computer 208.

Visual search graphical user interface 300 may assist the customer in searching for available products and identifying desirable products that are related to and/or complementary to displayed product 302. A related product may be of the same type as the displayed product 302, and a complementary product may be used with the displayed product 302. For example, related products may be different styles of shoes, and complementary products may be socks. In another example, related products may correspond to soccer shorts while complementary products may include soccer cleats. Facilitator server 204 may be configured to determine attributes of the product 302, and search for related and complementary products. Example attributes may include color, shape, pattern, texture, style, manufacturer, or other attributes of the product. Based on the attributes, facilitator server 204 may identify related products and complementary products that have one or more of the attributes. According to one arrangement. Visual search graphical user interface 300) may present related products 308 in field 306 and complementary products 310 in field 312. Other visual arrangements of related and complementary products may be provided. in some example, the visual arrangement may be user-selected or defined. In other examples, the visual arrangement may be selected based on the type of related product or the type of complementary product.

Visual search graphical user interface 300 may assist the customer in visually searching for a desired product similar to how the customer would shop at a physical store. Visual search graphical user interface 300 may permit the customer to specify which attributes 320 are of interest, and/or one or more components of the product 302 that are of interest. Example attributes may include color 320A, shape 320B, pattern 320C and texture 320D shown attribute field 304. In an example, attribute field 304 may permit a customer to select between different shoe shapes (e.g., high tops, running, cross training, dress, high heel, etc.), different patterns (e.g., polka dot, striped, no pattern, etc.), different textures (e.g., smooth, rough, etc.), and the like. A component of a product may be a portion of the product. For example, a product may be broken down into any desired set of components (e.g., an image of a car may include components such as a wheel, fender, door, roof, etc.). Example components of a shoe may include a heel, sole, shoe lace, closure, toe box, etc. In some examples example, a product may have attributes but no components. Additionally or alternatively, the user may be allowed to weight each of the attribute according to a level of importance or desirability to the user. The user may also weight different values for the each of the attribute. For example, the user may find both polka dots and stripes desirable, but polka dots more desirable than stripes. Accordingly, the user may define a desirability weight of the polka dots value of the pattern attribute to be higher than the desirability weight of the stripes value of the pattern attribute.

In some arrangements, one or more components of a product may have attributes that are the same as or different from the product's attributes. That is, while both the product and any of its components may have common attributes (e.g., color and texture), the product may have a certain set of attributes (e.g., color, shape, pattern, texture), while one or more components may have a different set of attributes (e.g., a closure component may include the attribute of "type", including none, hook-and-loop, laces, zipper, etc.). Thus, in such arrangements, the search and recommendation process may be performed with additional granularity based on component-specific attributes in addition or alternatively to the attributes of the overall product (e.g., shared attributes of the product as a whole, including its various components).

Attribute field 304 may receive input from the customer identifying which attributes 320A-D are of interest, input rating one or more of the attributes 320A-D on a scale (e.g., from 1 to 10, not important to very important, etc.), and/or any undesired attributes (e.g., no products colored blue). For example, a customer may specify that they desire to see related products having the same color as product 302, and rate the other attributes as being not important or less important. Attribute field 304 may also include a drop down menu, color wheel, grid or other manner of presenting options for each of the attributes.

Attributes may be defined and provided in various ways. For example, attributes may be a fixed set for one or more products, or fixed across all products of the same type. In some example, attributes may be user-specified, e.g., in FIG. 3, each Field 320A-B may have an associated pull down menu, so that the user can select among offered attributes. The number of attribute fields may be limited in number, as shown, or otherwise. As well, the pull down menus may offer options, some of which are (indicated as) not available, at least in that instance. Alternatively to the fixed fields of attributes, as shown, the number of attributes may be user-determined, e.g., as a static configuration or dynamically as the user searches. In this case, a pop up may be used for attributes, such that the user can simply select among the offerings (similar to the box for component selection of FIG. 6).

Ratings may also be implemented. A rating may be applied to each of the attributes, either to rank them amongst each other (e.g., top to bottom), or to rank by applying weightings (e.g., no importance or desirability to utmost importance or desirability). Ratings may be implemented variously, including by having a slider (e.g., horizontal) under and one to one with each attribute field 320A-D in turn. The user may elect to rate some or all of the attributes.

Figure 4:
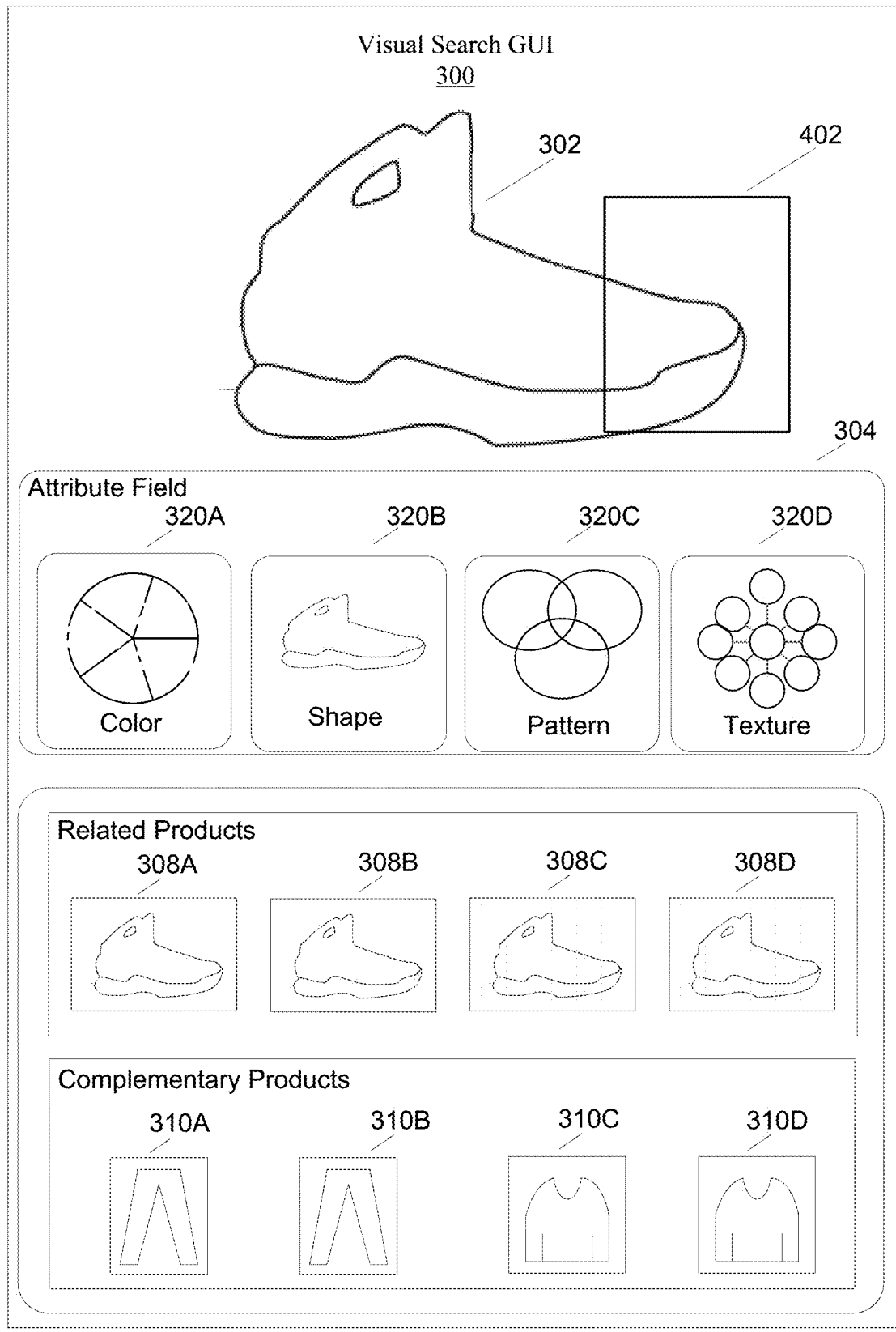
FIG. 4 illustrates an example field in a Visual Search GUI positioned around a desired portion of a selected product, in accordance with example embodiments.

To further assist the customer, input may be provided by the customer to select or represent a portion of a product, any desired component of the product, or any desired subcomponent of the product. For example, visual search graphical user interface 300 may provide a focusing field 402, as seen in FIG. 4, that the customer may locate, size, shape or otherwise provide around any desired portion of the product, any desired component of the product, or any desired subcomponent of the product. To provide input, the customer may use an input device (e.g., computer mouse, touch screen, etc.) of display computer 208 to draw and/or position focusing field 402 around a desired portion (e.g., component or sub-component) of the product 302. Focusing field 402 may be any desired size and shape (e.g., rectangle, circle, etc.), including any irregular or free-form shape. Focusing field 402 may also be of a fixed size where the customer may position the field 402 to include a certain portion of the product 302 within the focusing field 402. The image of the product 302 may be rotated, inverted, and/or otherwise modified to display the product 302 at any desired angle so that focusing field 402 can be placed at a desired location.

Upon determining that the focusing field 402 has been situated/positioned at a desired location, is the components implicated by the focusing field 402 may be determined or identified. For example, the image of the product 302 may be embedded with metadata or other information specifying that certain regions of the image correspond to certain components or sub-components of the product 302. If some or all of a component or sub-component region is included in the field 402, display computer 208 may identify that a particular component or sub-component is implicated. Implication, in one or more examples, may correspond to selection. As an example, display computer 208 may identify that a particular component is implicated if that component is entirely located within the field 402. As another example, facilitator server 204 may identify that a particular component is implicated if a certain percentage of a component or component region (e.g., more than 50%) is within the field 402. In another example, visual search graphical user interface 300 may also highlight one or more components of the product 302 when a customer places a finger and/or a cursor overtop of the one or more components to indicate selection of the one or more components. The customer may tap on a computer mouse (or other input device) and/or may tap on a display screen overtop of the one or more components during selection. Highlighting may involve changing color and/or providing other indication that one or more components have been selected.

Figure 5:
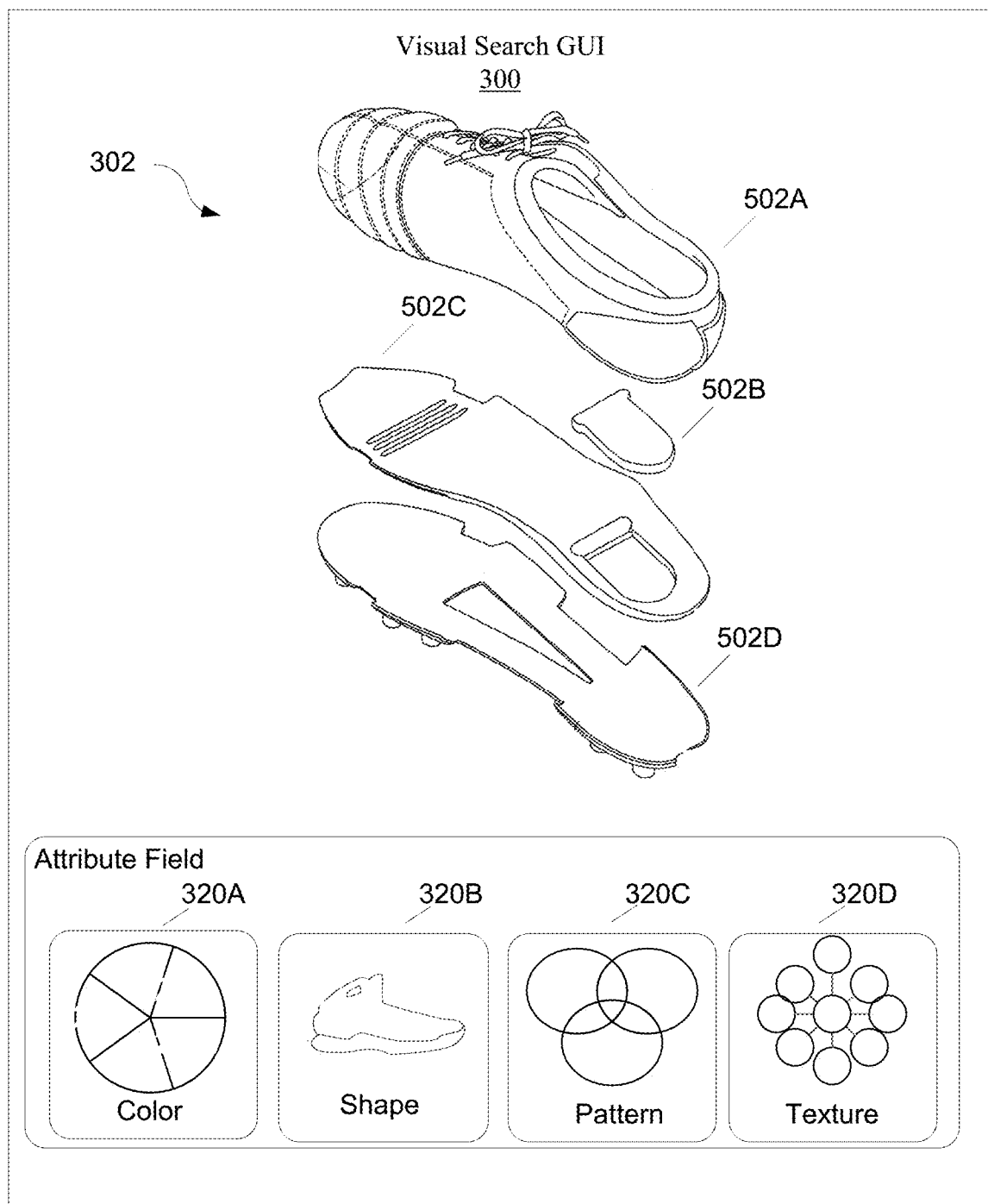
FIG. 5 illustrates an example of a Visual Search GUI presenting an exploded view of a selected product, in accordance with example embodiments.

In some examples, graphical user interface 300 may highlight multiple components or sub-components in the event a customer places a cursor and/or the customer's finger overtop of a particular region. For example, in the event of a user's input potentially corresponds to multiple components or sub-components, graphical user interface 300 may present an exploded and/or enlarged view of the product 302 (or a relevant portion of product 302), such as components 502A-D as seen in FIG. 5, to assist the customer in more particularly identifying the component or components of interest. As another example, visual search graphical user interface 300 may provide (e.g., display) a selected components field 602, as seen in FIG. 6, indicating which components and/or sub-components have been selected. The selected components field 602 may permit the customer to keep or remove certain components. Additionally, display computer 208 may present an input field 604 (e.g., pop-up field), as seen in FIG. 6, in visual search graphical user interface 300 permitting the customer to input text to clarify which one or more components or sub-components is of interest within the field 402.

According to one or more arrangements, responsive to components and/or sub-components being identified and/or the attributes 320 being rated, a product search/recommendation process may be triggered. For example, upon a customer providing information identifying one or more components of a product, rating each of the identified components, identifying one or more attributes, rating one or more attributes, or combinations thereof, the product search/recommendation process may be automatically initiated. In some examples, the product search/recommendation process might only be initiated upon a user selecting a search command.

Initiation of the product search/recommendation process may include display computer 208 generating a search message (e.g., a Boolean search query) based on the user-specified information (e.g., ratings, selection of components or sub-components, selection of attributes, selection of attribute values, etc.) and communicating the search message to facilitator server 204. In arrangements, where the search and recommendation process is performed using a kiosk or stand-alone computing device, the search may be internal to the display computer, e.g., data may be stored locally. Also, display computer 208 may forward a boundary of the field 402 within the image to facilitator server 204, instead of determining which components are included within focusing field 402. Instead, facilitator server 204 may process the boundary/shape to determine which components and/or sub-components are included within focusing field 402.

The search message may be processed so as to search for desirable and/or recommended products based on at least one of the customer-identified attributes, the ratings of the attributes, the components or sub-components identified by the customer, and/or the components identified to be within focusing field 402. In an example, responsive to a search message, facilitator server 204 may query a product memory or database 218 (see FIG. 2) to identify a list of potentially desirable and/or recommended products based on a unique product identifier (e.g., SKU, barcode, QR code, NFC/RFID data, etc.) of product 302, the rated attributes, and/or the identified components. The search message may specify to exclude all products having an attribute specified as being undesirable, and/or the facilitator server 204 may remove from search results any products having an attribute specified as being undesirable. In further examples, the search message may be structured or the search results may be filtered/supplemented based on selections other than a current selection by the customer (e.g., customer's prior or other current selections of any one or more of: the user's "friends": the consuming community generally: the consuming community specific to demographic filters: and/or criteria or other input from the company/store, or its suppliers, fulfillment entities or other relationships). The list of similar, desirable or recommended products may include a list of related products and/or a list of complementary products. The list of related products may include products that are of the same type as the one selected by the customer (e.g., different styles of shoes) and the list of complementary products may include products that are complementary to the customer selected product (e.g., socks, shirts, and pants may be complementary to shoes, etc.). The listings of complementary products and related products may also include complementary and related products available for purchase from affiliates of an entity (e.g., company, organization, proprietor, etc.) providing the visual search graphical user interface 300, for example.

Products may be identified as being complementary based on identifying a type of the selected product (e.g., type=shoe, shirt, pants, hat, etc.), and then identifying one or more other product types that may be used in conjunction with the selected product. For example, if the type of the selected product is a shoe, complementary product types may include other types of clothing (e.g., socks, pants, shirts, hats), accessories (e.g., handbags), etc. Complementary products may include other products that are routinely purchased along with the selected product, even if the other products appear to be completely unrelated. In an example, facilitator server 204 may determine, or otherwise have information (e.g., from other servers), that customers often purchase hand sanitizer when buying shoes. Although hand sanitizer may seem completely unrelated to shoes, facilitator server 204 may identify a complementary relationship based on customer purchasing habits. Product memory 218 may store lists or other manners of associating complementary products with one another. Facilitator server 204 may use a type of the selected product to identify a complementary list, and then may identify complementary products having the same or similar attributes with the selected product. For example, the product memory 218 may store a list indicating that shoes, socks, and hats are complementary products. When identifying complementary products to shoes, facilitator server 204 may query the product memory 218 to retrieve socks and hats having the attributes specified by the customer.

The lists of related and complementary products may be sorted based on a variety of factors. For example, sorting may be performed based on whether the listed products have the identified components or sub-components and/or based on the attributes rated by the customer. In one example, facilitator server 204 may perform the sorting of the lists. The sorting may be performed using a number of criteria. For example, to sort the list of related products, facilitator server 204 may identify a set of all products of the same type as product 302, having all of the attributes most highly rated by the customer, and having all of the identified components and/or sub-components. Other criteria may also be used. From there, the facilitator server 204 may identify which products in the set also have the next highest rated attributes, continuing through each of the attributes in descending order based on attribute ratings specified by the customer. Facilitator server 204 may place products, if any, that include all of the rated attributes and all of the desired components at the top of the list. Thereafter, facilitator server 204 may include the products, if any, having all of the desired components and all of the rated attributes except the lowest rated attribute in the list. Subsequently, facilitator server 204 may place the products, if any, having all of the desired components and all of the rated attributes except the two lowest rated attributes in the list, and so forth. If the list includes some but not all of the desired components, facilitator server 204 may identify products having a largest number of desired components and/or the products having a largest number of desired components corresponding to the highest rated attributes.

In an example, the customer may specify that shoe color (e.g., red) is extremely important, that a shape of the shoe (e.g., high top) is very important, and that a certain pattern of the product is important (e.g., striped). Facilitator server 204 may include any shoes having all three rated attributes at the top of the list (e.g., red high top with stripes), followed by any shoes having the top two rated attributes (e.g., red high top without stripes), and then any shoes having only the top rated attribute (e.g., red shoes that are not high tops and do not include stripes).

Facilitator server 204 may similarly sort the list of complementary products based only on the attributes if none of the complementary products have the identified components, and/or may also use identified components when ranking. Further, facilitator server 204 may use other relationships for ranking a listing of complementary products. For example, facilitator server 204 may have or obtain data specifying customers who purchase the selected product most frequently purchase a second product. Facilitator server 204 may rank the listing of complementary products based on which products are most frequently also purchased when product 302 is also bought or may have access to such rankings.

Facilitator server 204 may communicate each of the ranked listing of related products and/or a list of complementary products to display computer 208 for presentation in visual search graphical user interface 300. Each similar product contained in either of the lists may include one or more of an image of the similar product, a description of any attributes of the similar product, information on any endorsers of the similar product, advertisements of the similar product (e.g., banner advertisements, video, audio, etc.), pricing information, availability, a network link (e.g., URL) to a webserver to purchase the similar product, and/or other information to assist the customer. Using the visual searching techniques described herein, system 200 may aid the customer in identifying similar products.

Figure 7:
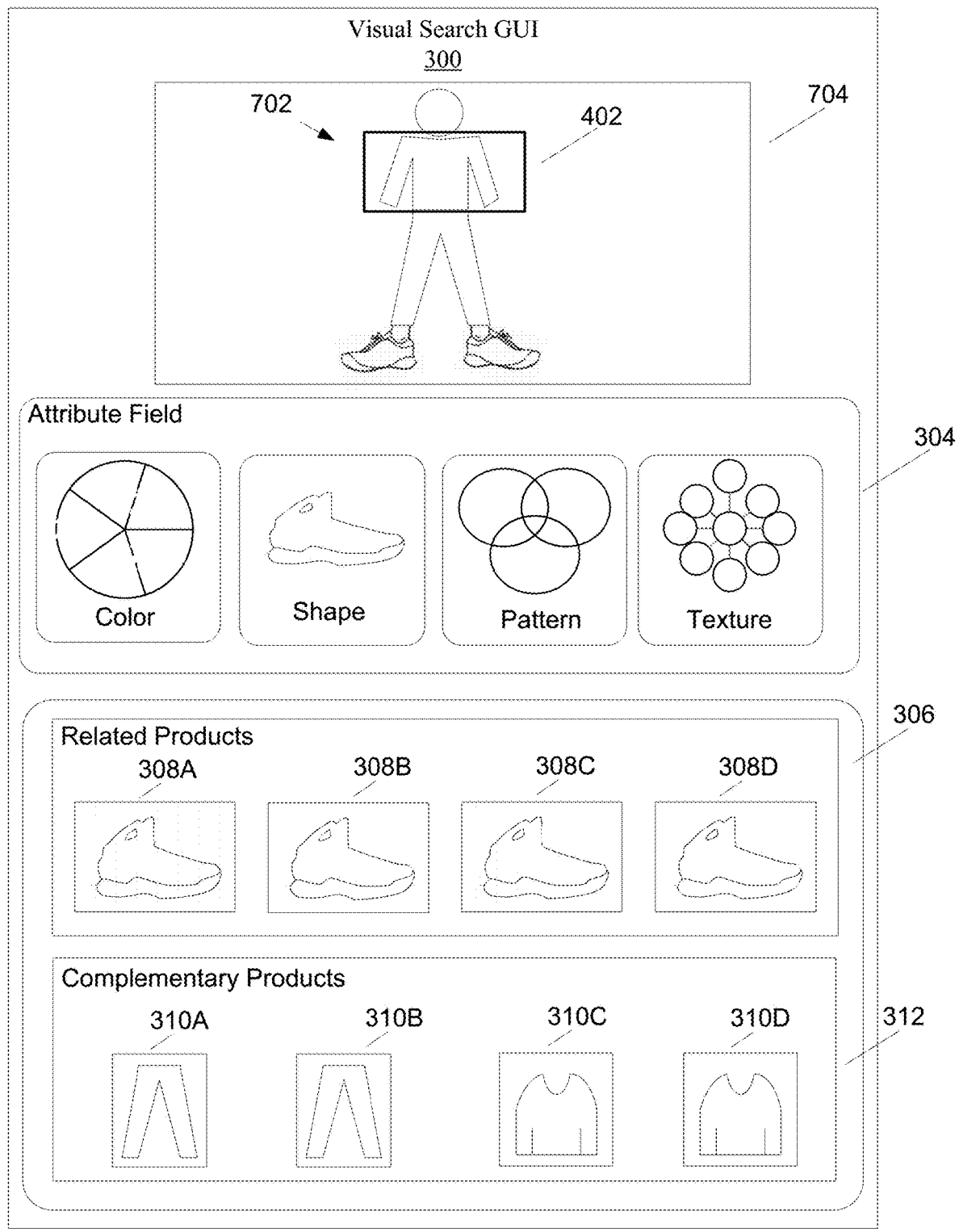
FIG. 7 illustrates an example of a Visual Search GUI permitting a customer to select an item having an attribute for identifying a group of items having a same or similar attribute, in accordance with example embodiments.

In a further aspect, visual search graphical user interface 300 may assist shoppers with making outfitting decisions when entering a retail store or shopping online. For example, a store may have a kiosk with a camera that may take a picture of a customer's outfit or the customer may upload a picture of themselves or someone else (e.g., celebrity, athlete, friend, etc.) at the kiosk, using a website of a retailer, via email, via SMS, via Twitter, etc. For example, a user may take a picture of an athlete at a sporting event or of a celebrity they see walking by on the street. As seen in FIG. 7, visual search graphical user interface 300 may present an image 702 of a customer in field 704 taken by a kiosk. A customer may also direct the kiosk camera to take a picture of a particular object of interest (e.g., a fabric sample, tread on a shoe, etc.). Image 702 may also be of a non-clothing item, including, for example, a poster (e.g., concert poster, Olympic poster, movie poster, celebrity poster, etc.), an animal, a rock, a landscape, a building, or any other image that a customer desires to upload.

Customer may provide input via Attribute field 304 to rate various attributes of a product shown in image 702, and may also adjust a location of focusing field 402 in image 702 to emphasize a particular portion of the image 702. For example, field 402 may be placed overtop of a shirt of the customer. Field 402 may be of any desired shape, and may be irregular. In other examples, field 402 may be omitted. When omitted, facilitator server 204 may attempt to determine what is depicted in image 702 (e.g., person, shoe, shirt, watch, dog, landscape, etc.). If a person is identified, facilitator server 204 may identify information about the articles of clothing worn by the customer. In an example, facilitator server 204 may determine types of clothing worn, color of the clothing, fit of the clothing (e.g., baggy fit, slim fit, etc.), texture of the clothing, patterns in the clothing, style of the clothing, product logos of the clothing, etc. For example, facilitator server 204 may determine that the customer in the image 702 is wearing red running shoes, blue jeans, a grey shirt, a black watch, and a red hat. Facilitator server 204 may also identify what the customer in the image 702 is not wearing. For example, facilitator server 204 may determine that a customer is not wearing a belt and is not wearing a necklace. In another example, facilitator server 204 may determine that a user is wearing a golf shirt, but is not wearing a golf jacket.

Based on the identified types of clothing and the identified items not currently being worn, facilitator server 204 may determine related products and complementary products for presentation to the customer. For example, facilitator server 204 may process image 702 to determine one or more of a type of shoes worn by the customer (e.g., running, basketball, dress, etc.), one or more colors of the shoes, one or more patterns included in the shoes, one or more textures of materials used in the shoes, a product logo of the shoes. Facilitator server 204 may use the information on the shoes collected from image 702 to create an outfit based on complementary articles of clothing sold by the retailer. For example, facilitator server 204 may determine from image 702 that a customer is wearing shoes having the colors green and gold, as well as the shade of the identified colors (e.g., hunter green, neon green, etc.).

Facilitator server 204 may then update visual search graphical user interface 300 presented by display computer 208 to include related and/or complementary products. As seen in FIG. 7, visual search graphical user interface 300 may include a related products field 306 depicting one or more related products 308A-D available for purchase and a complementary products field 312 depicting one or more complementary products 310A-D available for purchase. In an example, related products field 306 may display shoes having colors similar to the ones depicted in image 702. Instead of or in addition to color, a customer may select in attribute field 304 one or more of shape, pattern, and texture, as well as one or more components and/or subcomponents, to guide facilitator server 204 in retrieving related and complementary products. In an example, for complementary products, visual search graphical user interface 300 may include in field 312 a shirt and pair of pants that have the same or similar color green as in the shoes depicted in image 702. In other examples, field 312 may display complementary products having a same or similar shape, pattern, texture, etc. A customer may select a particular one of the products in field 306 or 312 to purchase, or may continue visually searching for a desired product.

As part of visual searching, a customer may select one or more of the items shown in fields 306 and 312 to instruct the visual search graphical user interface 300 to retrieve additional products having the same or similar attributes as the selected items. In an example, a customer may select one or more of the products 308 and/or 310 having one or more attributes, components, or subcomponents that are closest to what the customer desires to purchase. Based on the selected products, facilitator server 204 may determine one or more additional products available for purchase having the same or similar attributes, components, or subcomponents. For example, Field 306 may present four different types of shoes. A customer may select one of the shoes. Based on the selection, facilitator server 204 may determine one or more of attributes, components, and subcomponents of the selected shoe. Similar to the discussion provided above, a customer may specify a subset of the attributes components, and subcomponents to use when searching for similar products, rate the attributes, components, and subcomponents, etc. In an example, to specify particular attributes, components, and/or subcomponents, visual search graphical user interface 300 may replace image 702 in field 704 with the selected product to permit the customer to use focusing field 402 to highlight a particular portion, attribute, component and/or subcomponent of the shoe. Customer may also identify and/or rate attributes to be used for visual searching.

Based on the input provided by the customer, display computer 208 may generate and communicate a search message to facilitator server 204 to search for additional products. Facilitator server 204 may identify a new group of one or more related products 308 for presentation by visual search graphical user interface 300. For example, facilitator server 204 may generate a search message based on the selected shoe, identified component(s), subcomponents, and/or attribute(s) (or subset of the attributes identified by the customer), and ratings indicated in the search message. Facilitator server 204 may search product memory 218 based on the search message to identify a list of products, as described above. Facilitator server 204 may communicate the list to display computer 208 for presentation to the customer in the visual search graphical user interface 300. A customer may select to purchase a particular one of the related products from the list, or may proceed through the visual search process again to obtain a second (or subsequent) new list of related products. A customer may perform visual searches for related products as many times as desired. To avoid showing the same search during repeated searches, visual search graphical user interface 300 may filter out or otherwise to flag to the customer products that have been previously shown, previously considered, previously "accepted" or "rejected," etc. visual search graphical user interface 300 may similarly permit the customer to perform one or more visual searches for one or more new sets of complementary products 310. Advantageously, visual search graphical user interface 300 may permit a customer to visually search for products and lessen any gap the customer may perceive between shopping in store versus shopping on line.

In a further example, a visual search may assist the customer with locating a particular product within a store or in another store (e.g., store of a partner or subsidiary retailer). For example, a customer may walk into a store and take a picture of a physical product or product display (or barcode, QR code, product name, brand, RFID/NFC data, etc.) using, e.g., a mobile device (e.g., mobile phone, tablet computer, etc.) or other computing or communication device having a built-in camera. In one example, the physical product display may be a shelf including one or more products that may be of the same type (e.g., a shelf including 50 shoes) or may be of different types (e.g., a shelf including shoes, footballs and bags). The mobile device may be configured to process the picture (or barcode, QR code, product name, brand, RFID/NFC data, etc.) to determine a allocation of a particular product or particular type of product within the physical product display. In an example, the mobile device may store an image of the particular product and may compare color, shape, pattern, and textures of products identified in the product display with those of the particular product to determine whether a match exists. Alternatively or additionally, facilitator server 204 associated with the store may perform the comparison. If a match is identified, mobile device may highlight the particular product within the picture (e.g., using an arrow, flashing a particular subsection of the picture, placing a shape around the product within the picture, etc.). If no match is identified, mobile device may communicate with facilitator server 204 to determine whether the particular product is in stock. If not in stock, facilitator server 204 may offer to order the particular product for the customer and have the product shipped to the store or to the customer's home.

The mobile device may also communicate (e.g., wired or wirelessly) with facilitator server 204 to obtain additional information about the shoe. For example, the additional information may include sizes of the particular product in stock, products that other customers have purchased in combination with the particular product, and sales or discounts for the particular product.

Determining whether a product is among a field of products (e.g., a shelf or other area of products) may be performed in a variety of ways. In one example, an image of products may be analyzed using image analysis to identify distinct products among the image. The identified products may then be compared (e.g., using image matching techniques) to a database of known products to determine matches. Attributes of the determined matches may be extracted from the database and stored in the mobile device for further consideration (e.g., comparison with a reference product or the like). For example, the mobile device may determine whether the product is within the field of products based on a comparison of the attributes of the matching products and the attributes of the reference product. In other examples, each product in a field of products may include a code or tag (e.g., barcode, QR code, RFID tag). A device may scan each code or tag to identify the products. Attributes of those products may further be determined from an internal database of the device or by querying an attribute server/database. A matching product may then be identified from the field of products based on the code or tag or based on the one or more attributes. For example, if the user wishes to locate an exact product, the device may search for an exact match (e.g., the code or tag corresponds to the same product identifier or the image analysis identifies one or more of the products as corresponding to the same product as the reference item). In another example, if the user wishes to identify similar or potentially desirable products, attributes may be compared according to aspects described herein.

In one or more arrangements, a system may be configured to scan a user and to identify products related to one or more products worn by the user. For example, when a user enters a retail store, a recommendation system may scan (e.g., take a picture of) the user. Products worn by the user may then be identified by image analysis or by scanning product codes/tags. Related and/or similar products may then be identified and recommended to the user based on attributes, pre-defined relationships between products and the like.

Figure 8:
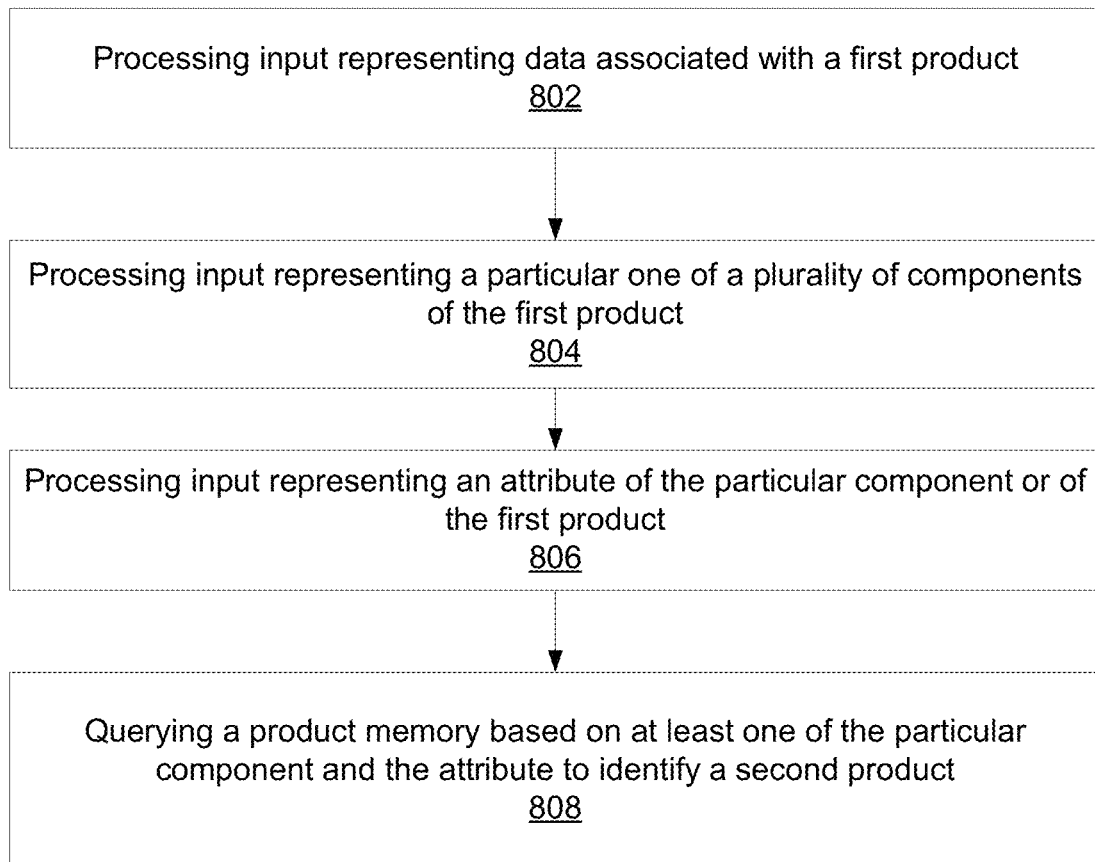
FIG. 8 illustrates an example flow diagram of a method of visual searching for a similar product, in accordance with example embodiments.

FIG. 8 illustrates an example flow diagram of a method of visually searching for similar products, in accordance with example embodiments. The method may be implemented by at least one apparatus such as, for example, facilitator server 204, a computer, a server, or other computational device. The method may also be stored on a non-transitory and/or tangible computer readable medium as computer executable instructions. The order of the blocks shown in FIG. 8 is an example. The blocks may be arranged in other orders, each function described in each block may be performed one or more times, some blocks may be omitted, and/or additional blocks may be added. The method may begin at block 802.

In block 802, the method may include receiving and processing input representing (e.g., including) data associated with a first product. The data may include, for example, an image of the product, a barcode, a QR code, SKU, RFID/NFC data, product name, brand, etc. In block 804, the system may process input representing one or more components of the first product. For example, a user may select a desirable or non-desirable component of the first product. The system may then recognize this selection and modify a search to compensate for the user's feelings regarding the selected component or components of the initial product. In block 806, the system may further process input representing an attribute of the particular component or of the product. In block 808, the system may search a product memory or database based on at least one of the selected/ identified one or more components and the one or more attributes. The search may be performed to identify one or more other products that may be potentially desirable to the user based on the user input received regarding the first product. The one or more other (e.g., second) products may include at least one of the particular component and the attribute, may include a component similar to particular component, may include an attribute similar to the attribute, or combinations thereof. For example, the component or attribute may be "similar to" by meeting some criteria or criterion of being close or "equivalent." The criteria or criterion may be fashion driven, performance driven, otherdriven, or some combination. In some instances, the component may not, in fact, visually resemble that selected component and/or attribute. However, fashionistas or footwear engineers may "see" it as a "close" or "equivalent." The method may then end, return to any of the preceding blocks, or repeat one or more times. It is noted that the steps of the example flow diagram depicted in FIG. 8 may be performed in other orders, and steps may be added and/or removed.

Figure 9:
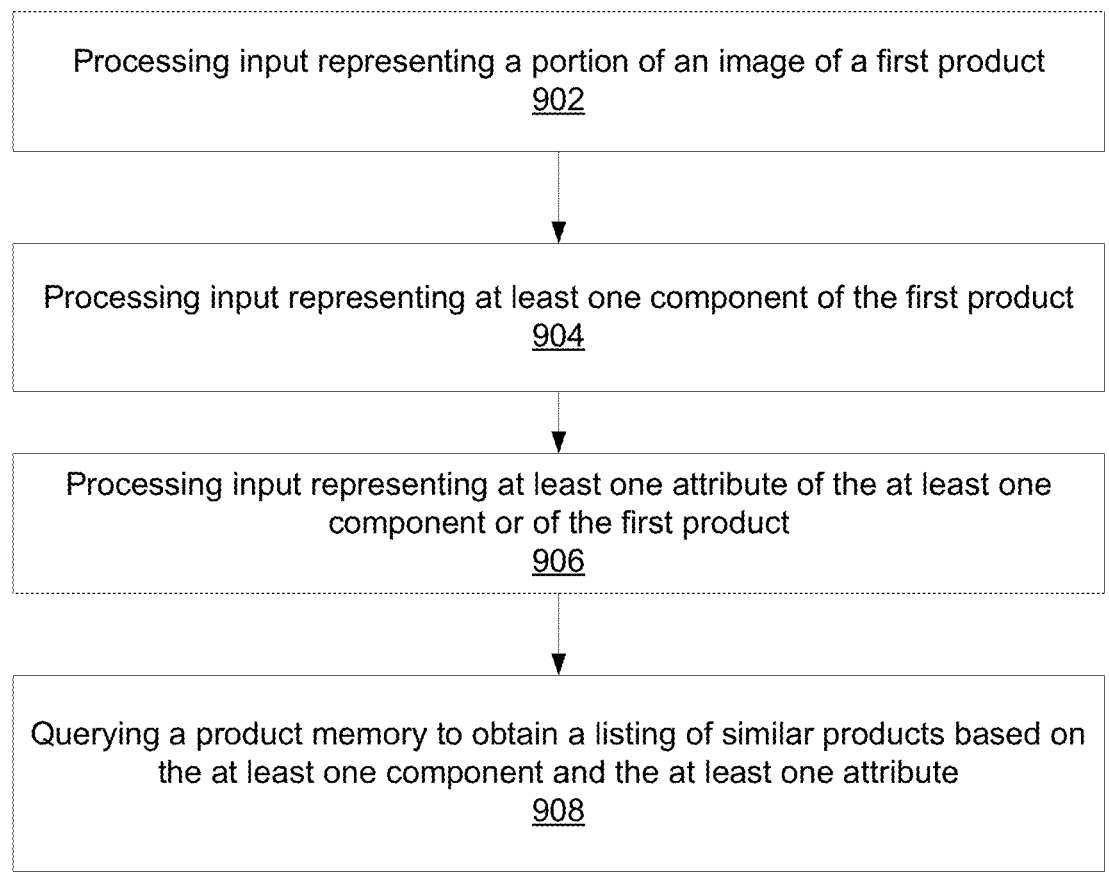
FIG. 9 illustrates an example flow diagram of a method for visual searching to obtain a listing of similar products, in accordance with example embodiments.

FIG. 9 illustrates an example flow diagram of a method of visually searching to obtain a listing of similar products, in accordance with example embodiments. The method may be implemented by at least one apparatus such as, for example, facilitator server 204, a computer, a server, or other computational device. The method may also be stored on a non-transitory and/or tangible computer readable medium as computer executable instructions. The order of the blocks shown in FIG. 9 is an example. The blocks may be arranged in other orders, each function described in each block may be performed one or more times, some blocks may be omitted, and/or additional blocks may be added. The method may begin at block 902.

In block 902, the method may include processing input corresponding to (e.g., representing) a portion of an image of a first product. In block 904, the method may include processing input specifying at least one component of the first product. In block 906, the method may include processing input representing at least one attribute of the at least one component or of the first product. In block 908, the method may include searching a product memory to obtain a listing of similar products based on the at least one component and the at least one attribute. Searching the product memory may include, in some examples, generating a search query and executing the query against a product database. Other types of searching may also be performed to obtain a list of similar products. The method may then end, return to any of the preceding blocks, or repeat one or more times. It is noted that the steps of the example flow diagram depicted in FIG. 9 may be performed in other orders, and steps may be added and/or removed.

Figure 10:
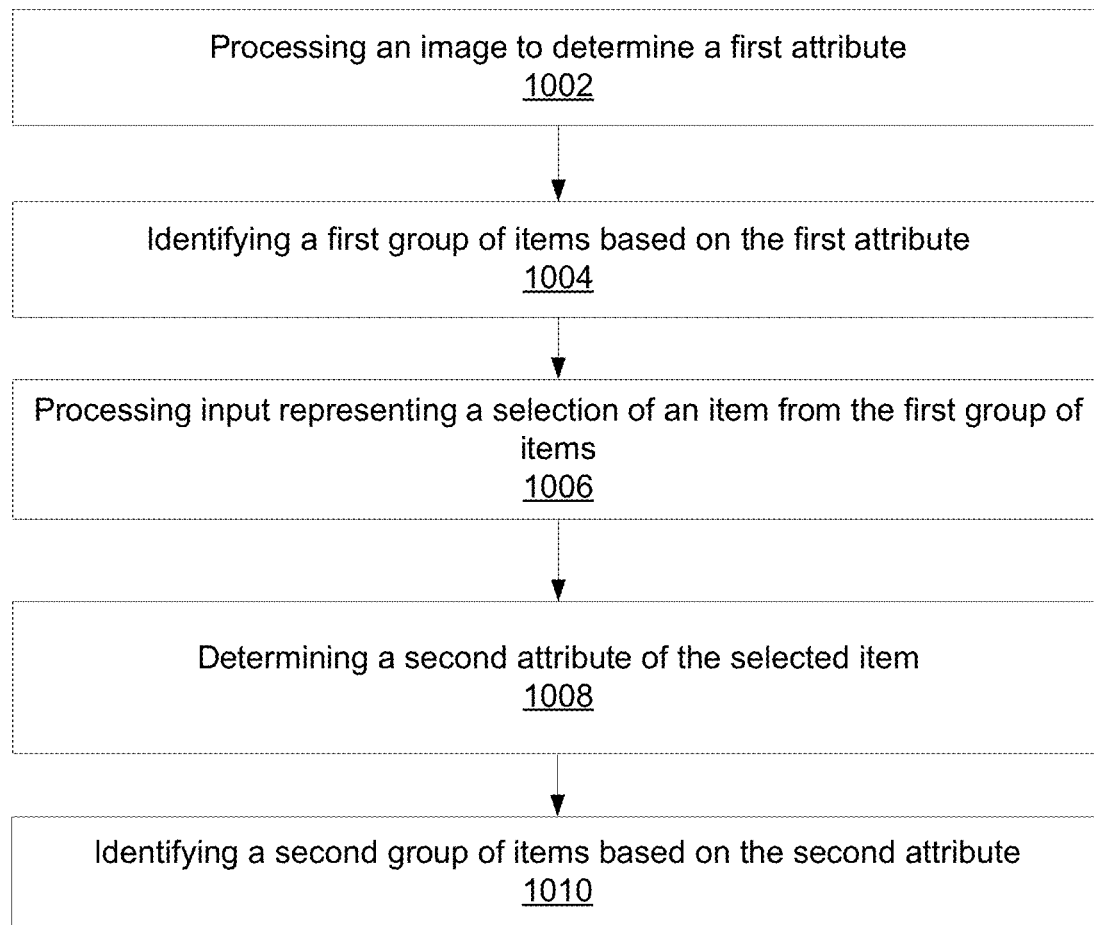
FIG. 10 illustrates an example flow diagram of a method for determining an attribute to identify a group of items having a same or similar attribute, in accordance with example embodiments.

FIG. 10 illustrates an example flow diagram of a method for determining an attribute to identify a group of items having a same or similar attribute, in accordance with example embodiments. The method may be implemented by at least one apparatus such as, for example, facilitator server 204, a computer, a server, or other computational device. The method may also be stored on a non-transitory and/or tangible computer readable medium as computer executable instructions. The order of the blocks shown in FIG. 10 is an example. The blocks may be arranged in other orders, each function described in each block may be performed one or more times, some blocks may be omitted, and/or additional blocks may be added. The method may begin at block 1002.

In block 1002, the method may include processing an image or other data (e.g., textual, metadata, audio data, etc.) to determine a first attribute that may be relevant to and/or indicative of product desirability. For example, a customer may upload an image of him or herself, of another person, of a painting, of a photograph, etc. The customer may specify a particular attribute from the image, or facilitator server 204 may process the image to identify an attribute. The attribute may be a color, texture, pattern, shape, manufacturer, style, etc.

In block 1004, the method may include identifying a first group of items based on the first attribute. For example, facilitator server 204 may identify a group of products available for purchase from a retailer having the attribute and/or a particular value of the attribute. For instance, the attribute may be a color and facilitator server 204 may identify a group of watches having the color.

In block 1006, the method may include processing input representing a selection of an item from the first group of items. In an example, facilitator server 204 may process a selection by a customer of a particular shoe from a first group of running shoes (e.g., versus soccer cleats). In other examples, the system may process input representing the selection of multiple items from the first group of items.

In block 1008, the method may include determining a second attribute of the selected item (or selected group of items). In an example, facilitator server 204 may determine an attribute of the selected item or a common attribute among a selected plurality of items. The customer may indicate the attribute, or facilitator server 204 may automatically identify one or more attributes of the selected item. In some examples, the second attribute may be determined by determining an attribute of the selected item and matching the attribute with an attribute of the image or other initial input data (e.g., from which the first attribute was determined). In a particular example, a selected tennis shoe may comprise multiple different textures. Selecting one or more (but not all) of the textures of the tennis shoe as the second attribute or attributes may include matching the textures of the tennis shoe to textures exhibited in the initial input data form which the first attribute was determined. By using such a matching scheme, the user's interest in the attribute may be reinforced/confirmed.

In block 1010, the method may include identifying a second group of items based on the second attribute. For example, facilitator server 204 may determine a second group of items that differs from the first group and that includes the second attribute. The method may then end, return to any of the preceding blocks, or repeat one or more times. It is noted that the steps of the example flow diagram depicted in FIG. 10 may be performed in other orders, and steps may be added and/or removed.

Various other features and devices may be used in accordance with the aspects described herein. Additional or alternative features may also be incorporated into the device and/or applications associated therewith.

While the invention has been described with respect to specific examples including modes of carrying out the invention, those skilled in the art will appreciate that there are numerous variations and permutations of the above described systems and methods. For example, various aspects of the invention may be used in different combinations and various different subcombinations of aspects of the invention may be used together in a single system or method without departing from the invention. In one example, software and applications described herein may be embodied as computer readable instructions stored in at least one computer readable medium. The computer readable media may be non-transitory and/or may be a memory. Also, various elements, components, and/or steps described above may be changed, changed in order, omitted, and/or additional elements, components, and/or steps may be added without departing from this invention. Thus, the invention should be construed broadly as set forth in the appended claims.

What is claimed is:

1. A method comprising:
 receiving an image uploaded to a computing device;
 processing an uploaded image to identify a first product, the first product including a plurality of components, each component forming a portion of the first product, wherein the image is embedded with metadata linking one or more regions of the image to each component of the plurality of components;
 receiving, via an interactive user interface, input selecting a component of the plurality of components of the first product, wherein receiving input includes:
  determining that a focusing field of the interactive user interface has been positioned at a location of the image;
  determining whether at least a threshold percentage of the component at the location is within the focusing field;
  responsive to determining that at least the threshold percentage of the component at the location is within the focusing field, selecting the component; and
  processing, by the computing device, the embedded metadata within the focusing field location of the image to determine one or more attributes of the component;
 receiving input selecting a first attribute from the one or more attributes of the component of the first product;

querying, by the computing device, a product memory based on the component and the first attribute to identify a first group of items; and displaying, by the computing device, images of items in the first group of items.

2. The method of claim 1, further including:

determining a plurality of regions for the uploaded image of the first product, each of the regions corresponding to a respective one of the plurality of components;

identifying a subset of the regions each of which being at least partially located within a selected portion of the uploaded image of the first product; and identifying a subset of the components associated with the subset of the regions.

3. The method of claim 2, further comprising:

causing presentation of a listing of the subset of the components prior to querying of the product memory; and processing a selection from the listing to identify the component.

4. The method of claim 1, further comprising processing input representing a rating for the first attribute.

5. The method of claim 1, further comprising causing display of the first product in an exploded view that individually displays each of the plurality of components.

6. The method of claim 1, further comprising identifying and causing presentation of a second product that is complementary to the first product.

7. The method of claim 6, wherein the second product is identified as being complementary to the first product by:

identifying a type of the first product; and processing the type to identify a listing of products that are frequently purchased together with the first product.

8. The method of claim 1, further comprising:

upon receiving input selecting the first attribute, displaying selectable values for the first attribute of the selected component; and receiving a selection of a value for the first attribute, wherein identifying the first group of items includes querying the product memory based on the selected value for the first attribute.

9. The method of claim 1, further comprising:

receiving user selection of an item from the first group of items;

determining, by the computing device, a second attribute of the selected item;

querying, by the computing device, the product memory based on the second attribute to identify one or more additional items matching the second attribute; and displaying, by the computing device, the one or more additional items matching the second attribute.

10. One or more non-transitory computer readable media storing computer executable instructions that, when executed, cause a computing device to:

process an uploaded image to identify a first product, the first product including a plurality of components, each component forming a portion of the first product, wherein the uploaded image is embedded with metadata linking one or more regions of the uploaded image to each component of the plurality of components;

receive, via an interactive user interface, input selecting a component of the plurality of components of the first product, wherein receiving the input includes;

determining that a focusing field of the interactive user interface has been positioned at a location of the uploaded image;

determining whether at least a threshold percentage of the component at the location is within the focusing field;

responsive to determining that at least a threshold percentage of the component at the location is within the focusing field, selecting the component; and processing the embedded metadata within the focusing field location of the image to determine one or more attributes of the component;

query a product memory based on the component to identify a first group of items; and display images of items in the first group of items.

11. The one or more non-transitory computer-readable media of claim 10, further including instructions that, when executed, cause the computing device to:

determine a plurality of regions for the uploaded image of the first product, each of the regions corresponding to a respective one of the plurality of components;

identify a subset of the regions each of which being at least partially located within a selected portion of the uploaded image of the first product; and identify a subset of the components associated with the subset of the regions.

12. The one or more non-transitory computer-readable media of claim 11, further including instructions that, when executed, cause the computing device to:

cause presentation of a listing of the subset of the components prior to querying of the product memory; and process a selection from the listing to identify the component.

13. The one or more non-transitory computer-readable media of claim 10, further including instructions that, when executed, cause the computing device to:

receive input selecting a first attribute from one or more attributes of the component of the first product; and process input representing a rating for the first attribute.

14. The one or more non-transitory computer-readable media of claim 10, further including instructions that, when executed, cause the computing device to cause display of the first product in an exploded view that individually displays each of the plurality of components.

15. The one or more non-transitory computer-readable media of claim 10, further including instructions that, when executed, cause the computing device to identify and cause presentation of a second product that is complementary to the first product.

16. The one or more non-transitory computer-readable media of claim 15, wherein the second product is identified as being complementary to the first product by:

identifying a type of the first product; and processing the type to identify a listing of products that are frequently purchased together with the first product.

17. An apparatus, comprising:

at least one processor; and at least one memory coupled to the processor and storing computer-executable instructions that, when executed by the processor, cause the apparatus to:

process an uploaded image to identify a first product, the first product including a plurality of components, each component forming a portion of the first product, wherein the uploaded image is embedded with metadata linking one or more regions of the uploaded image to each component of the plurality of components;

receive, via an interactive user interface, input selecting a component of the plurality of components of the first product, wherein receiving the input includes;

determining that a focusing field of the interactive user interface has been positioned at a location of the uploaded image;

determining whether at least a threshold percentage of the component at the location is within the focusing field;

responsive to determining that at least a threshold percentage of the component at the location is within the focusing field, selecting the component; and processing the embedded metadata within the focusing field location of the image to determine one or more attributes of the component;

query a product memory based on the component to identify a first group of items; and display images of items in the first group of items.

18. The apparatus of claim 17, further including instructions that, when executed, cause the apparatus to:

receive input selecting a first attribute from one or more attributes of the component of the first product; and process input representing a rating for the first attribute.

19. The apparatus of claim 17, further including instructions that, when executed, cause the apparatus to cause display of the first product in an exploded view that individually displays each of the plurality of components.

20. The apparatus of claim 17, further including instructions that, when executed, cause the apparatus to identify and cause presentation of a second product that is complementary to the first product.

* * * * *